United States Patent
Rana et al.

(10) Patent No.: US 7,436,618 B1
(45) Date of Patent: *Oct. 14, 2008

(54) CIRCUIT AND METHOD FOR PROTECTING EMERGENCY HEAD-RETRACT CAPACITOR IN A HARD DISK DRIVE

(75) Inventors: Sakti Rana, Singapore (SG); Yayue Zhang, Singapore (SG); Siew Yong Chui, Singapore (SG)

(73) Assignee: Marvell International Ltd., Hamilton (BM)

( * ) Notice: Subject to any disclaimer, the term of this patent is extended or adjusted under 35 U.S.C. 154(b) by 62 days.

This patent is subject to a terminal disclaimer.

(21) Appl. No.: 11/485,597

(22) Filed: Jul. 12, 2006

Related U.S. Application Data (63) Continuation of application No. 11/254,944, filed on Oct. 20, 2005, now Pat. No. 7,116,512, which is a continuation of application No. 10/818,327, filed on Apr. 5, 2004, now Pat. No. 6,972,921.

(51) Int. Cl.
*G11B 21/02* (2006.01)
*H02J 7/00* (2006.01)
*H01G 2/12* (2006.01)

(52) U.S. Cl. .................. 360/75; 320/166; 361/15
(58) Field of Classification Search .................. None
See application file for complete search history.

(56) References Cited

U.S. PATENT DOCUMENTS

| | | | |
|---|---|---|---|
| 5,498,951 | A | 3/1996 | Okamura et al. |
| 5,783,928 | A | 7/1998 | Okamura |
| 6,020,724 | A | 2/2000 | O'Loughlin |
| 6,204,638 | B1 | 3/2001 | Nishioka et al. |
| 6,614,134 | B1 | 9/2003 | Davies |
| 6,876,238 | B1* | 4/2005 | Kelkar et al. ............. 327/157 |
| 6,958,591 | B1* | 10/2005 | Smith ..................... 320/163 |
| 2002/0141102 | A1 | 10/2002 | Kusumoto |
| 2004/0251884 | A1 | 12/2004 | Steffie et al. |
| 2005/0116737 | A1* | 6/2005 | Pentakota et al. .......... 326/31 |
| 2005/0134220 | A1* | 6/2005 | Brohlin et al. ............ 320/128 |

* cited by examiner

*Primary Examiner*—Jason C Olson (57) ABSTRACT

A protection circuit for a capacitor comprises a voltage pump that selectively charges the capacitor. A current source selectively charges the capacitor. A controller compares a charging voltage to a threshold charging voltage and selects at least one of the voltage pump and the current source based on the comparison.

28 Claims, 6 Drawing Sheets

CIRCUIT AND METHOD FOR PROTECTING EMERGENCY HEAD-RETRACT CAPACITOR IN A HARD DISK DRIVE

CROSS-REFERENCE TO RELATED APPLICATIONS

This application is a continuation of U.S. patent application Ser. No. 11/254,944 filed on Oct. 20, 2005, which is a Continuation of U.S. patent application Ser. No. 10/818,327 filed on Apr. 5, 2004. The disclosures of the above applications are incorporated herein by reference in their entirety.

FIELD OF THE INVENTION

This invention relates to hard disk drive head control mechanisms and more particularly to emergency head-retraction capacitor circuits.

BACKGROUND OF THE INVENTION

Hard disk drives are an indispensable component in most modern computing/data handling systems. The disk drive uses one or more spinning magnetic media platters to store digital data, which can be dynamically written to and read from the platter(s) using a moving read/write head assembly. A single 3-4 inch diameter platter face may store hundreds of millions, or billions, of bits of data. The data is, thus, intensely compacted into the magnetic media of the platter. As such, platters are extremely sensitive to even the smallest degree of physical contact such contact virtually guaranteeing destruction of data and possibly the destruction of the overall disk drive. For this reason, the read/write head is mounted so as to avoid contact with the spinning platter at all times, riding on a cushion of air several microns above the platter surface. In this manner, the head is still close enough to transfer magnetic signals, but far enough to prevent contact with the platter. When not in use, the head shuttles to a neutral "parked" position, typically near an inner race of the disk, where it is safely insulated from contact with the data-storing platter media.

In the event of a system failure, uncontrolled shutdown or other catastrophe, a sudden loss of power to the disk drive may occur. In such an instance, regular system power may be unavailable to park the head. In larger (PC for example) disk drives, a spindle motor back-electromotive force (BMEF), derived from the generating capability of a deenergized, rotating spindle motor, has sufficient amplitude to retract the head in the event of power failure. However, in a small-form factor drive, such as that used in a laptop computer and other portable applications, the BMEF amplitude is insufficient to be harnessed for emergency-retract purposes. Thus, to retract the head in a small-form factor drive, a special continuously pre-charged capacitor circuit is employed. When the circuit senses a loss of power, it immediately provides a large amplitude to drive the head to a parked position.

Figure 1:
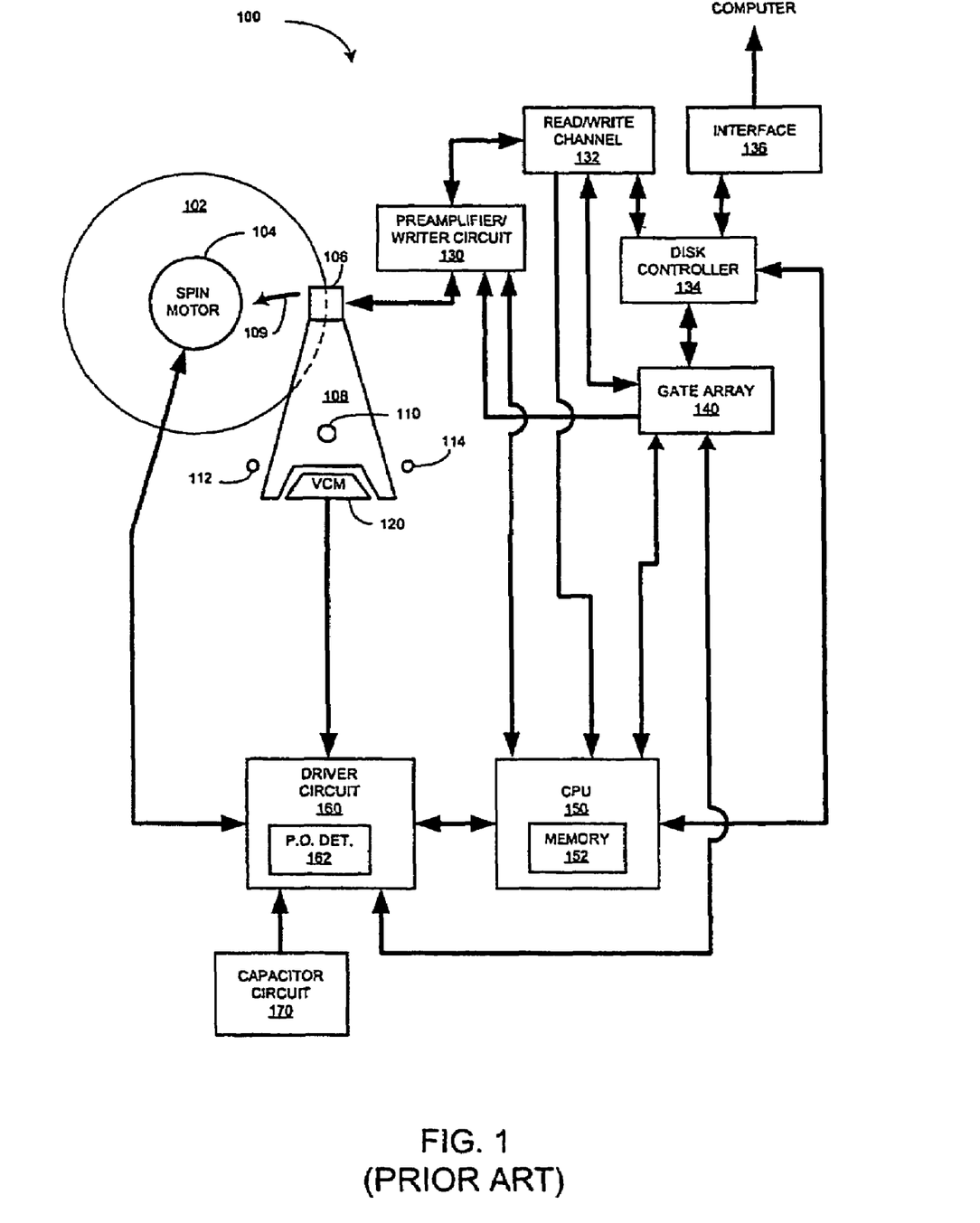
FIG. 1, already described, is a schematic diagram of an exemplary hard disk drive spindle, platter and head interconnected with a control circuit having an emergency head-retract capacitor circuit according to the prior art.

FIG. 1 shows an exemplary small-form factor disk drive assembly 100 of conventional design. A disk platter 102 (there may be several stacked together) is rotated at a high speed by a spin motor 104. A read-write head 106 (there may also be several stacked together) is mounted on a distal end of a carefully balanced moving arm 108 that traverses the surface of the disk along an arcuate path (curved arrow 109), defined by a pivot 110. The arm moves between two limit stops 112 and 114 that delineate, respectively, a maximum outer travel and maximum inward travel (to park) of the arm.

A voice coil motor (VCM) 120 provides a variable magnetic force to the arm 108 to modulate its movement with respect to the platter. In this manner data stored at various concentric locations on the platter can be read or written.

The head 106 connects to a preamplifier/writer circuit 130 that amplifies data signals retrieved by the head from the platter during a read phase and that includes a digital-to-analog converter that drives data signals for transmission by the head to the platter during a write phase. Likewise, the circuit 130 connects to a read/write channel 132, which controls the transfer of data to and from the head. The channel includes an analog-to-digital converter, as well as various encoding and decoding functions of conventional design. The read/write channel 132, in turn, connects to a disk controller 134 that processes read data for trans-mission to a host computer (not shown) via an interface 136, while also processing write data from the host computer via the interface. Operation of the circuits in assembly 100 is directed under timing control of a gate array 140 configured to generate appropriate timing signals that synchronize and advance various data transfer operations and other disk operations.

A central processing unit (CPU) 150, comprising a microprocessor, microcontroller or other circuit, interconnects with various circuits as shown. The CPU 150 includes a memory 152 for storing a control program which, among other things, coordinates head movement across the platter to properly locate the head 106 for a desired read/write operation. The CPU connects to a driver circuit 160 to direct movement of both the spin motor 104 and arm/head via the VCM 120. The driver circuit 160 includes a number of conventional sub-components (not described) for effecting proper spin speed and head movement. Significantly, the driver circuit 160 includes a power-off detector (P.O. Det) 162 that senses a loss of power to the disk drive assembly and "gates" current from a capacitor of capacitor circuit 170 (described above). Using this current, the driver circuit directs the VCM to immediately park the head, before spin has ceased and before the associated air cushion between the platter and head has subsided.

A significant quantity of power is needed to guarantee rapid and full retraction of the arm in an emergency. It is desirable to reduce the size of the capacitor in circuit 170 as much as possible, thereby limiting the ability to provide a large margin of error in its charge capacity. In other words, the capacitor is sized, in small form-factor environments, much closer to a required maximum rated charge level and is maintained at a charge (during operation) quite close to that maximum. Because of its size, the capacitor is an expensive component and should be adequately protected against damage due to overcharging. In one exemplary implementation, the capacitor may have a size of approximately 300 microFarads, with a maximum breakdown voltage of approximately 6.3 Volts. The required charge for an adequate retract amplitude is approximately 5.8 Volts—thus, a relatively small safety margin in charging the capacitor is present. Where the capacitor's charging voltage closely approaches or exceeds the breakdown voltage, its reliability may be negatively affected and, long-term, it may deteriorate, leak, or even burnout.

Figure 2:
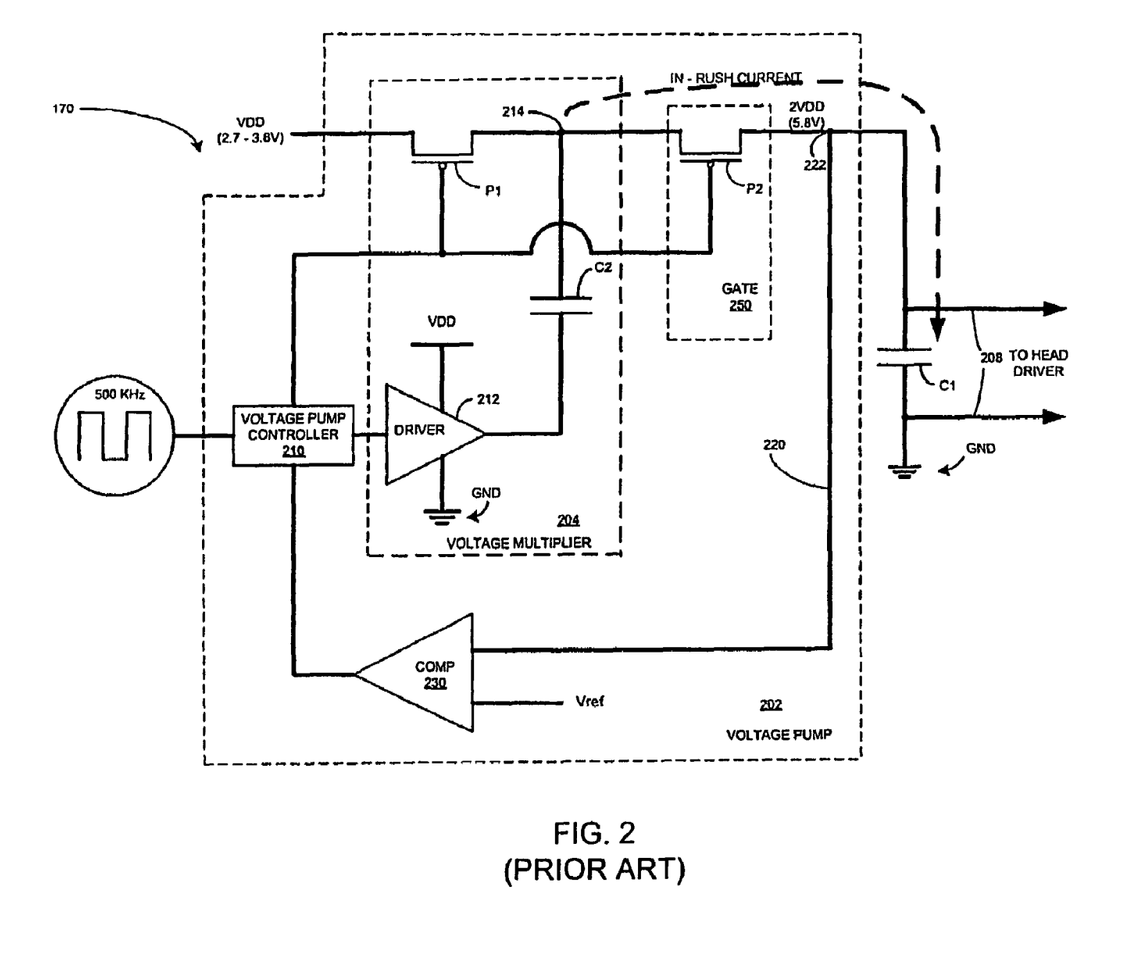
FIG. 2, already described, is a schematic diagram of the emergency head-retract capacitor circuit of FIG. 1, according to the prior art.

FIG. 2 details the emergency head-retract capacitor circuit 170 that includes a voltage pump 202 for charging an emergency head-retract capacitor C1, according to the prior art. The emergency head-retract capacitor C1 is a 300-microfarad capacitor with a maximum charging voltage of 6.3 Volts in this example. The capacitor is connected on one end to a charging circuit (voltage pump 202) and on the opposing end to ground (GND). A pair of leads 208 across the capacitor C1 transmits power to head driver circuit 160 when needed for an emergency retract operation. As noted above, excess charging may cause permanent damage or even fire to occur. Thus, the capacitor is limited to an input charging voltage of approximately 5.8 Volts (2VDD) in this example. The input voltage VDD from, e.g., a system battery or other current source is between 2.7 and 3.6 Volts. Charging of the capacitor C1 is also characterized by an in-rush current, shown as the dashed line 205, and discussed further below. As charge is "pumped" by the voltage pump 202 into the capacitor C1 (so as to be available at the outputs 208 for driving the retraction), the maximum charging voltage is regulated/limited by the pump to remain at or below specified (typically by the manufacturer of the capacitor) voltage limits. Regulation of maximum charging voltage serves to preserve and extend the life of the capacitor C1 and prevent its untimely failure.

A voltage multiplier 204 (a voltage doubler in this example) is employed to provide the desired charging voltage, which is typically greater than VDD. To control the operation of the voltage multiplier and selectively apply charge current to the emergency head-retract capacitor C1, the voltage pump 202 also employs a controller 210 that is driven by an oscillating current (500 KHz in this example). The voltage pump controller 210 can be any acceptable state-machine or processor implementation (a field programmable gate array or application-specific integrated circuit, for example). In this example, the controller is used to selectively gate an input charge current (in-rush current 205) to the emergency head-retract capacitor C1, while simultaneously multiplying (doubling) the voltage from VDD to 2VDD. As such, the controller 210 provides an input to a driver 212 that alternatively energizes a capacitor C2 with VDD or shunts it to ground (GND). C2 is a 470-microfarad capacitor in this example. While the capacitor C2 energizes, the controller 210 simultaneously switches gate transistor P1 of voltage multiplier 204 to gate VDD to junction 214. In response to switching of the transistor P1, the capacitor C2 drains to provide a second VDD source, causing the input charge current of doubled voltage 2VDD to flow from the junction 214. This charge current, having the predetermined pump voltage (5.8 Volts), is also simultaneously gated by a second transistor P2 (gate 250) that is selectively operated by the controller 210 to apply the charge to the emergency head-retract capacitor C1. A second lead 220 branches from junction 222 (between transistor P2 and capacitor C1) and connects to a voltage comparator 230 that compares the charging voltage at lead 220 with a reference voltage Vref. In this example, Vref is set to approximately 5.8 Volts, the maximum accepted capacitor-charging voltage. An output of the comparator 230 is fed to the controller 210. When the charging voltage at lead 220 exceeds Vref (5.8 Volts), the output of comparator 230 signals the controller 210 to cease pumping the capacitor C1 with charge. Hence the above-described circuit provides adequate protection for charging voltages in excess of the desired 5.8 Volts. This is particularly useful as VDD can sometimes approach 3.6 V (i.e. 2VDD=7.2 Volts>5.8 maximum) under certain circumstances.

Inasmuch as the above-described circuit appropriately addresses an undesirable high charging voltage level, another symptom often associated with the initial influx of power (at startup) is an undesirably high in-rush current. The above-described circuit does not adequately address excessive in-rush current conditions, which can deteriorate and damage the capacitor in the same manner as excess voltage. In addition, the capacitor circuit described above does not adequately monitor the health of the capacitor so that catastrophic failure (such as bursting and/or fire) can be avoided.

SUMMARY OF THE INVENTION

A protection circuit for a capacitor comprises a voltage pump that selectively charges the capacitor. A current source selectively charges the capacitor. A controller selectively activates the current source while deactivating the voltage pump when a charging voltage is less than a threshold charging voltage level and selectively deactivates the current source while activating the voltage pump when the charging voltage is greater than the threshold charging voltage level.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention description below refers to the accompanying drawings, of which.

DETAILED DESCRIPTION OF AN ILLUSTRATIVE EMBODIMENT

Figure 3:
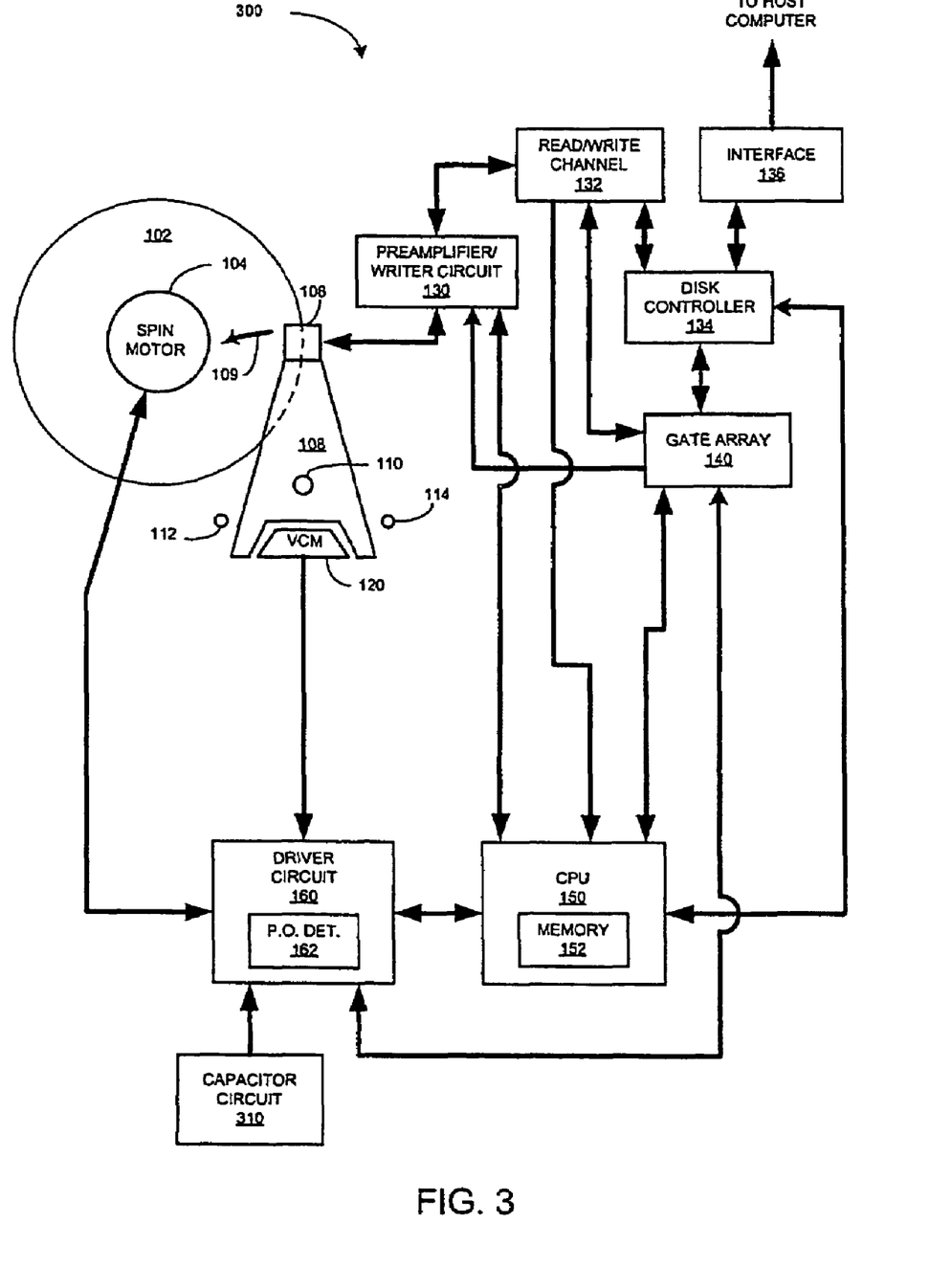
FIG. 3 is a schematic diagram of a hard disk drive including a spindle, platter and head interconnected with a control circuit having an emergency head-retract capacitor circuit according to an embodiment of this invention.

FIG. 3 shows a small-form factor hard disk drive and associated circuit components 300 that are similar to those described above with reference the exemplary small-form factor hard disk drive assembly 100 of FIG. 1. Accordingly, like components are provided with like reference numbers and the Background of the Invention above may be referred to for a further description of the structure and function of these like-numbered components. An emergency head-retract capacitor circuit 310 according to an illustrative embodiment of this invention is shown. The capacitor circuit 310 is connected to driver circuit 160 that detects unexpected power loss (via detector 162) and provides immediate emergency retraction power from the capacitor circuit 310 to VCM 120 so as to drive arm 108 and head 106 to a parked position and avoid damage to platter 102 (or head assemblies). The capacitor circuit 310 according to the illustrative embodiment is now described in further detail with reference to FIGS. 4 and 5.

Figure 4:
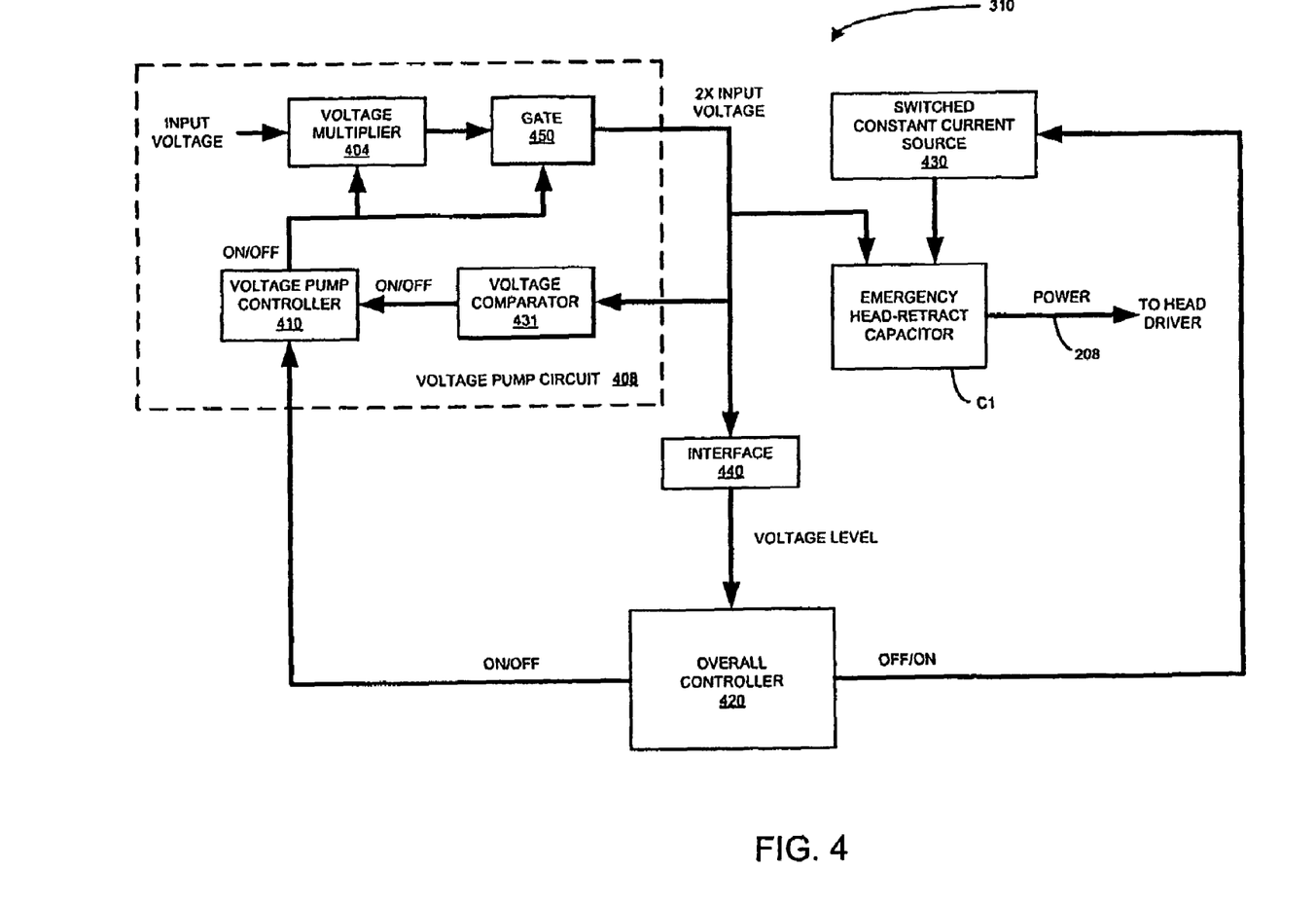
FIG. 4 is a functional block diagram of an emergency head-retract capacitor circuit according to an embodiment of this invention.

FIG. 4 is a functional block diagram illustrating the emergency head-retract capacitor circuit C1 and associated processor components according to an embodiment of this invention (circuit 310, in general). An emergency power output 208 connects an emergency head-retract capacitor C1 to head driver 160 (FIG. 3). The capacitor C1 also connects to a voltage pump 408. The voltage pump 408 multiplies input voltage (VDD) using a voltage multiplier 404 to obtain a doubled (2VDD) input voltage (typically 5.8 Volts) for charging the capacitor C1 with a regulated predetermined charging voltage level. A gate 450 (similar to transistor P2 in FIG. 2) controls application of the charging voltage. Both the gate 450 and multiplier 404 are switched by the voltage pump controller 410. The controller 410 decides whether to apply charging voltage to the capacitor C1 in response to the charging voltage present at an input of the capacitor C1. A voltage comparator 431 controls the voltage pump controller. In particular, the comparator 431 compares the present input charging voltage of capacitor C1 with a reference voltage (Vref=5.8 Volts in this embodiment). If the input voltage at the capacitor is less than the reference voltage, then the comparator 431 signals the controller 410 to activate the multiplier 404 and gate 450 of voltage pump to pump the capacitor with charging voltage.

As discussed above, even when the charging voltage is tightly regulated, an excessive in-rush current may also threaten to damage or degrade the capacitor C1. In-rush current may become excessive where the capacitor C1 exhibits a low initial charge, such as on system startup. To protect the capacitor C1 against excessive in-rush current at startup, an overall controller 420 is provided in this embodiment. The overall controller can be implemented as a software/firmware process running on a microcontroller or other processor (e.g., a CPU as described further below), or can be implemented as a state machine. In this embodiment, the overall controller 420 is embodied within a processor and connects via an interface 440 to an input of capacitor C1. The interface 440 detects the present input charging voltage at the capacitor C1 and transmits that input voltage as a digital value to overall controller 420. Based upon that digital value, the overall controller 420 decides whether there is a risk of excessive inrush current. If, at system start-up, an input voltage less than the specified input voltage (approximately 5.8 Volts for startup in this embodiment) is detected, the controller 420 instructs the voltage pump controller 410 to deactivate (shut off) the voltage pump 408, while instructing a switched constant current source 430 to activate and feed current at a constant, safe rate to capacitor C1. Note that, while a "constant" current source is illustratively employed, any acceptable current source that provides a safe, controlled level of charge current to the capacitor may be used and the term "current source" should be taken broadly to include a variety of such current sources. The overall controller 420 continuously monitors the input voltage at capacitor C1 via the interface 440. Upon sensing that the input charging voltage reaches a desired threshold level (5.8 Volts), the overall controller 420 deactivates (switches off) the constant current source 430 and signals the voltage pump controller 410 to activate the voltage pump 408 to provide a regulated charging voltage to the capacitor C1, as needed. In response to sensing a voltage drop below the threshold level, the controller 420 signals the controller 410 to switch off the voltage pump 408 and reactivates the constant current source until an appropriate charging voltage is restored at the capacitor C1. The operation of the circuit 310 is described in further detail below with reference to FIG. 6.

Note that the threshold voltage level at which constant-current charging is activated, instead of regulated voltage pumping, can vary. In one embodiment, the threshold level can be approximately the same as (perhaps slightly lower than) the maximum charging voltage for the capacitor. It is mainly desirable that the threshold voltage level used by the overall controller 420 be sufficiently high to ensure that any in-rush current (upon activation of the voltage pump 408) will not cause damage or otherwise degrade the capacitor C1. The higher the pre-sent input charging voltage (at capacitor C1) before the pump is activated, the lower the level of resulting in-rush current as the capacitor is pumped to the maximum desired charge. It is contemplated that the controller 420 may apply an intelligent control routine to the selection of current or voltage-based charging. For example, upon system power-up from an unpowered (and/or uncharged-capacitor) state, the threshold voltage level may be set at or near the maximum charge to insure that initial charging of the capacitor C1 is nearly entirely at a regulated current rate. Thereafter, during normal system runtime, a different (slightly lower) threshold level may be used by the overall controller so that the voltage pump 408 is mainly responsible for maintaining charge in the capacitor, with the current source 430 taking over only in the event of a significant loss of charge in the capacitor. The current source may never be required during normal runtime, as the voltage pump preferably maintains full capacitor charge at all times. However, the overall controller 420 and its interconnected constant current source 430, nevertheless, provide a valuable second level of monitoring and safe charging for the capacitor C1 in the event of a malfunction. To this end, the overall controller can be provided with a second threshold level to sense when the charge exceeds that second level. In this case, the voltage pump 408 may be malfunctioning and is shut down. Other corrective action, such as issuance of fault alerts and/or discharge of excess capacitor charge, may be undertaken in the event of an overcharging scenario.

Figure 5:
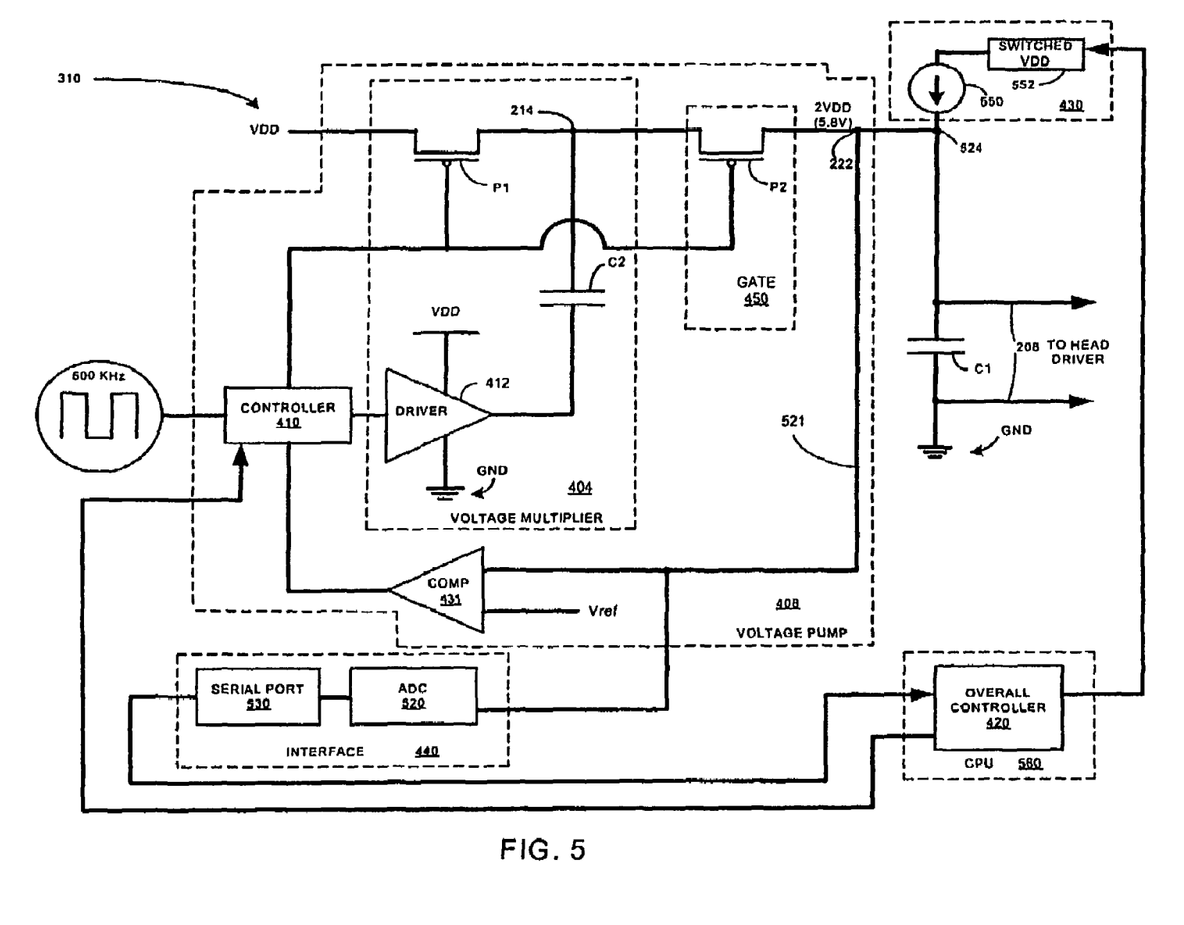
FIG. 5 is a schematic diagram of an emergency head-retract capacitor circuit according to an embodiment of this invention.

Reference is now made to FIG. 5, which is a schematic diagram of the emergency head-retract capacitor circuit of this embodiment. The emergency head-retract capacitor C1 (300-microfarad in this embodiment) is connected by leads 208 to the head driver 160 as described above. The capacitor C1 is also tied at one end to a charging circuit input (junction 524) and at the opposite end to ground (GND). Voltage pump 408 provides a regulated, predetermined voltage (when needed) to charge the capacitor C1. The pump 408 comprises voltage multiplier 404, gate 450, comparator 431 and voltage pump controller 410. The voltage pump controller 410 is driven by an oscillator that delivers a (for illustrative purposes) 500-KHz clock signal. The controller 410 switches a gate transistor P1 of voltage multiplier 404 to allow VDD (at an input of P1) to pass through the transistor and combine with VDD discharged from capacitor C2 (470-microfarad in this embodiment). Driver 412 (also switched by the controller 410), which is tied to VDD and ground (GND), alternately charges the capacitor C2 with VDD and discharges C2 to produce a multiplied/doubled voltage (2VDD=5.8 Volts) at the gate 450 (a second gate transistor P2). The gate transistor P2 is also switched by voltage pump controller 410 to selectively apply the regulated, doubled voltage to the input of emergency head-retract capacitor C1. The prevailing charging voltage at capacitor C1 is fed back via lead 521 to comparator 431, which compares that charging voltage with a reference voltage (Vref=5.8 Volts). When the charging voltage falls below Vref, the comparator signals the voltage pump controller 410 to open gates P1 and P2 and apply the regulated voltage to the capacitor C1.

The lead 521 also connects to interface 440 that, in this embodiment, comprises an analog-to-digital converter (ADC) 520 and a serial port 530. The analog-to-digital converter 520 converts the input charging voltage from capacitor C1 to a digital signal that is provided to the overall controller 420 via the serial port 530. As described above, the controller 420 can be a standalone circuit, a processor or another mechanism within a processor (CPU 560) as shown. The CPU 560 and serial port 530 may further be embodied within the same circuit as the other components described herein, or may be embodied as a different sub-system having appropriate software for responding to the input charging voltage and delivering any needed control signals.

The overall controller 420 provides these control signals to the voltage pump controller 410 and to the switched constant current source 430. In this embodiment, the current source 430 comprises a source of switched VDD 552 that is passed through a current regulator 550 to provide a predetermined regulated current at input junction 524 of capacitor C1. As described above, the current source 430 is switched on by the controller 420 and the voltage pump 408 (via voltage pump controller 410) is switched off when a risk of excessive in-rush current at the capacitor input is present based upon the retrieved input charging voltage (system startup conditions and excessively low-voltage being typical "triggers" for the current source). Conversely, where the input charging voltage is at an acceptably high level and the threat of excessive in-rush current is absent, the overall controller 420 switches the current source off and allows the voltage pump 408 to deliver regulated voltage to the capacitor as needed.

Figure 6:
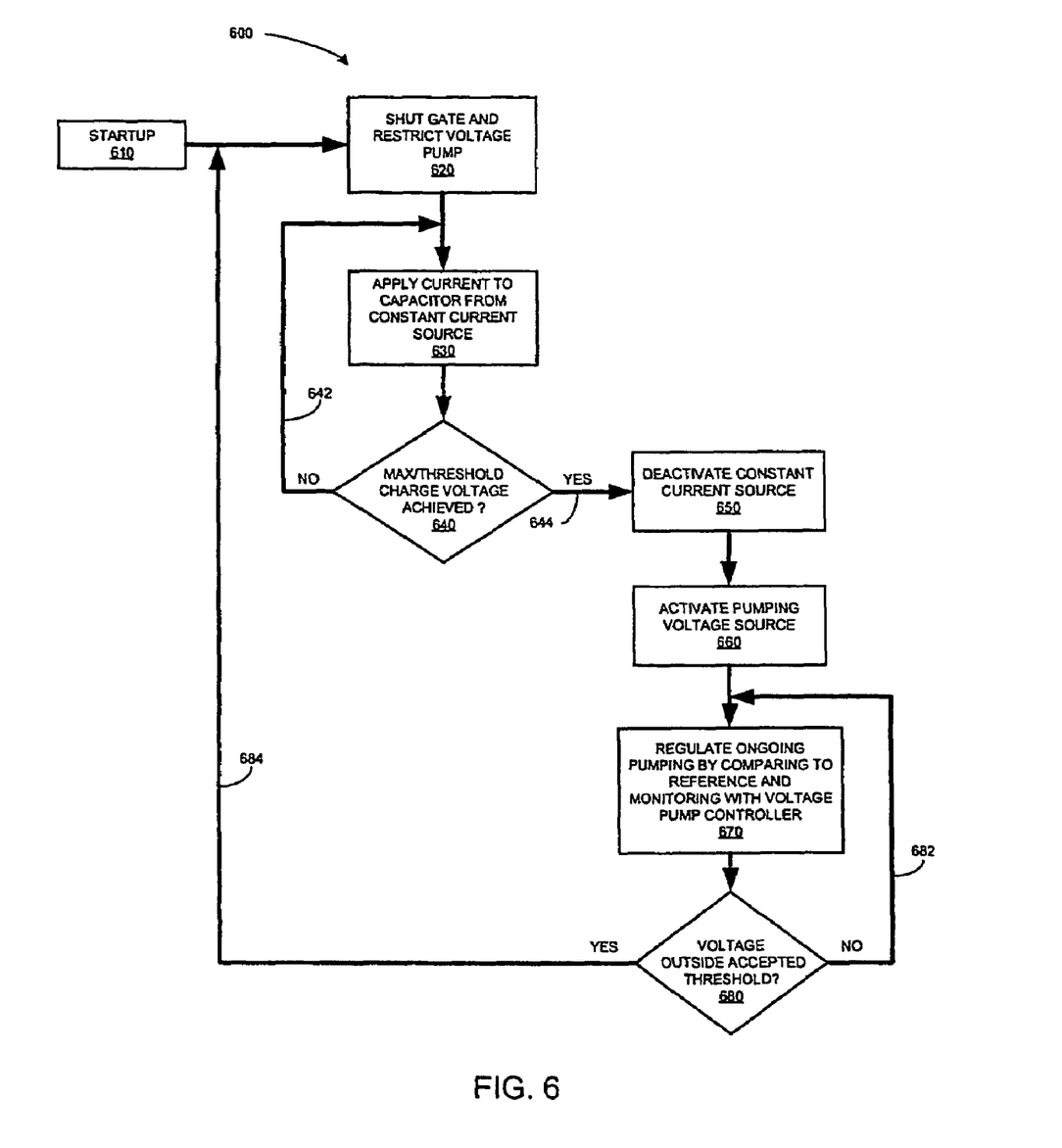
FIG. 6 is a flow diagram illustrating a procedure for charging and monitoring an emergency head-retract capacitor circuit according to an embodiment of this invention.

FIG. 6 is a flow diagram illustrating a procedure 600 for charging and monitoring the capacitor C1 according to an embodiment of the invention. Beginning at startup from an unpowered state (step 610), the procedure proceeds to step 620 where the overall controller 420 shuts the gates P1 and P2 via the voltage pump controller 410 to deactivate any voltage pumping at the regulated voltage 2VDD. At step 630, the overall controller 420 activates the constant current source 430 to apply current needed to charge the capacitor and, at decision step 640, determines whether the threshold charging voltage level (herein, approximately the maximum desired charge of 5.8 Volts in this embodiment) has been achieved. If not (branch 642), the procedure returns to step 630 where constant current application continues. If, however, maximum/threshold charge is achieved (branch 644), then the constant current source 430 is deactivated by the controller 420 at step 650 and the voltage pump controller 410 is instructed to activate the voltage pump by allowing the gates P1 and P2 to open as needed (step 660). Regulated pumping voltage (2VDD) is then applied to the capacitor C1 based upon the comparison with the reference voltage by the voltage comparator 431. The comparator 431 and voltage pump controller 410 continue to regulate the voltage to maintain the desired charging voltage level in the capacitor C1 (step 670), while the overall controller 420 continues monitoring the state of capacitor voltage as an added protection (decision step 680). The overall controller 420 allows regulated-voltage pumping to continue (branch 682) while capacitor voltage displays acceptable characteristics. Should the capacitor voltage rise above or fall below a certain range (branch 684) the overall controller 420 shuts the gates P1 and P2 (step 620) and reapplies constant current in accordance with steps 630 and 640 until a desired voltage charge level in the capacitor C1 is restored. Pumping and monitoring may then resume according to steps 650, 660, 670 and 680. If other action is needed, based upon the particular behavior of the capacitor voltage level, the overall controller 420 or another function within the CPU 560 may take other appropriate steps, such as issuance of alarms, draining of the capacitor, etc.

The foregoing has been a detailed description of preferred embodiments of the invention. Various modifications and additions can be made without departing from the spirit and scope thereof. For example, a variety of other monitoring functions can be carried out by the CPU with respect to the capacitor. In addition, the circuit shown and described herein can be applied to other types of hard disk drive and non-disk electronic devices requiring a sudden high-amplitude discharge of a given voltage, but where protection and monitoring of the discharging capacitor is desired. This description should be taken broadly, unless otherwise states, to include such alternate types of devices and implementations. Where a connection between components is shown and/or described, other components, such as buffers, etc., may be interposed between the connected components according to alternate embodiments with the two components remaining in communication with each other. Further, it is expressly contemplated that any of the elements or functions described herein can be implemented variously as hardware, software, including a computer-readable medium including program instructions, or a combination of hardware and software. Accordingly, this description is meant to be taken only by way of example, and not to otherwise limit the scope of this invention.

What is claimed is:

1. A protection circuit for a capacitor, comprising:
   a voltage pump that selectively charges the capacitor;
   a current source that selectively charges the capacitor; and
   a controller that compares a charging voltage to a threshold charging voltage and selects at least one of the voltage pump and the current source based on the comparison.

2. The protection circuit of claim 1 wherein the controller selectively activates the current source when the capacitor is in an uncharged state and the charging voltage is less than the threshold charging voltage level.

3. The protection circuit of claim 2 wherein the threshold charging voltage level is approximately equal to a maximum charging voltage level of the capacitor.

4. The protection circuit of claim 1 wherein the voltage pump includes a voltage pump controller that selectively charges the capacitor when the charging voltage is less than a reference voltage.

5. The protection circuit of claim 4 wherein the controller communicates with the voltage pump controller and selectively activates and deactivates the voltage pump controller.

6. The protection circuit of claim 5 wherein the voltage pump controller includes a voltage multiplier that communicates with an input voltage source.

7. The protection circuit of claim 1 further comprising an analog-to-digital converter that generates a digital signal based on the charging level of the capacitor.

8. The protection circuit of claim 1 wherein the current source provides a substantially constant current level to the capacitor.

9. A system comprising the protection circuit of claim 1 and further comprising a disk drive including a drive head assembly and a driver circuit that communicates with the capacitor and that selectively retracts a disk drive head assembly when the disk drive loses power.

10. A disk drive comprising:
    a platter;
    a moving head assembly that reads data from and writes data to the platter;
    a retraction circuit that communicates with a capacitor and that selectively retracts the head assembly;
    a voltage pump that selectively charges the capacitor;
    a current source that selectively charges the capacitor; and
    a controller that compares a charging voltage to a threshold charging voltage and selects at least one of the voltage pump and the current source based on the comparison.

11. The disk drive of claim 10 wherein the disk drive is a small form factor disk drive.

12. The disk drive of claim 10 wherein the retraction circuit selectively retracts the head assembly during a loss of power to the disk drive.

13. The disk drive of claim 10 wherein the controller selectively activates the current source when power is initially applied to the capacitor in an uncharged state and the charging voltage is less than the threshold charging voltage level.

14. The disk drive of claim 13 wherein the threshold charging voltage level is approximately equal to a maximum charging voltage level of the capacitor.

15. The disk drive of claim 10 wherein the voltage pump includes a voltage pump controller that charges the capacitor when the charging voltage is less than a reference voltage.

16. The disk drive of claim 15 wherein the controller selectively activates and deactivates the voltage pump controller.

17. The disk drive of claim 16 wherein the voltage pump controller comprises a voltage multiplier that communicates with an input voltage source.

18. The disk drive of claim 10 further comprising an analog-to-digital converter that converts the charging voltage level into a digital signal.

19. The disk drive of claim 10 wherein the current source provides a substantially constant current level to the capacitor.

20. A method for protecting a capacitor, comprising:
   selectively charging the capacitor using a voltage pump;
   selectively charging the capacitor using a current source;
   comparing a charging voltage to a threshold charging voltage; and
   selecting at least one of the voltage pump and the current source based on the comparison.

21. The method of claim 20 further comprising selectively activating the current source when the capacitor is in an uncharged state and the charging voltage is less than the threshold charging voltage level.

22. The method of claim 21 wherein the threshold charging voltage level is approximately equal to a maximum charging voltage level of the capacitor.

23. The method of claim 20 further comprising selectively charging the capacitor when the charging voltage is less than a reference voltage.

24. The method of claim 23 further comprising selectively activating and deactivating a voltage pump controller.

25. The method of claim 24 further comprising multiplying a voltage of an input voltage source.

26. The method of claim 20 further comprising generating a digital signal based on the charging level of the capacitor.

27. The method of claim 20 further comprising selectively providing a substantially constant current level to the capacitor.

28. The method of claim 20 further comprising selectively moving a disk drive head assembly using power stored in the capacitor.

* * * * *

UNITED STATES PATENT AND TRADEMARK OFFICE
CERTIFICATE OF CORRECTION

PATENT NO. : 7,436,618 B1  
APPLICATION NO. : 11/485597  
DATED : October 14, 2008  
INVENTOR(S) : Sakti Rana et al.

Page 1 of 1

It is certified that error appears in the above-identified patent and that said Letters Patent is hereby corrected as shown below:

Column 2, Line 15    Delete "trans-mission" and insert -- transmission --
Column 2, Line 50    Delete "microFarads" and insert -- microfarads --
Column 4, Line 48    Insert -- to -- after "reference"

Signed and Sealed this

Sixteenth Day of December, 2008

JON W. DUDAS  
*Director of the United States Patent and Trademark Office*